(12) United States Patent
Easley et al.

(10) Patent No.: US 8,264,606 B2
(45) Date of Patent: *Sep. 11, 2012

(54) DIRECT DIGITAL ENCODING AND RADIO FREQUENCY MODULATION FOR BROADCAST TELEVISION APPLICATIONS

(75) Inventors: Matthew Easley, Woodstock, GA (US); Matthew Barnhill, Duluth, GA (US); William Kevin Kay, Duluth, GA (US)

(73) Assignee: THAT Corporation, Milford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/942,796

(22) Filed: Nov. 9, 2010

(65) Prior Publication Data

US 2011/0050996 A1 Mar. 3, 2011

Related U.S. Application Data

(63) Continuation of application No. 12/627,317, filed on Nov. 30, 2009, now Pat. No. 7,830,452, which is a continuation of application No. 11/228,066, filed on Sep. 16, 2005, now Pat. No. 7,719,616.

(60) Provisional application No. 60/610,915, filed on Sep. 17, 2004.

(51) Int. Cl.
   - H04N 7/00 (2011.01)
   - H04N 5/38 (2006.01)
   - H04N 5/46 (2006.01)
   - H04H 20/47 (2008.01)
   - H04H 20/88 (2008.01)
   - H04H 40/36 (2008.01)

(52) U.S. Cl. ........ 348/485; 348/484; 348/723; 348/724; 348/729; 381/2

(58) Field of Classification Search ........................ None
See application file for complete search history.

(56) References Cited

U.S. PATENT DOCUMENTS

| 4,249,214 A | 2/1981 | Boyd |
| 4,339,772 A | 7/1982 | Eilers et al. |
| 4,398,216 A | 8/1983 | Field et al. |

(Continued)

FOREIGN PATENT DOCUMENTS

| JP | 1115147 A | 1/1996 |
| WO | WO2006034142 | 3/2006 |

OTHER PUBLICATIONS

English Translation of Mexican Office Action for related MX Application No. MX/a/2007/003153, 1 page.
Text of First Office Action of related CN Application No. 2005800383667, 10 pages.

Primary Examiner — Brian Yenke
(74) Attorney, Agent, or Firm — McDermott Will & Emery LLP

(57) ABSTRACT

A digital audio encoder, digital video conditioner, and a digital modulator are described for producing a television broadcast signal at a desired channel frequency range. Left and right audio channel signals are digitized and encoded according to a stereo standard and then combined to form a stereo audio signal. A second audio programming channel signal may be included. A video input can be digitized and conditioned to form a digital video channel. The stereo audio signal can be placed directly at a desired channel frequency by frequency modulation without the need for using an intermediate frequency. The digital video channel can be placed at a desired frequency by amplitude modulation. The digital and audio channels can be digitally combined to create a television transmission signal at a desired frequency and according to a desired standard.

7 Claims, 3 Drawing Sheets

U.S. PATENT DOCUMENTS

| | | |
|---|---|---|
| 4,405,944 A | 9/1983 | Eilers et al. |
| 4,821,097 A | 4/1989 | Robbins |
| 4,905,087 A | 2/1990 | Lupinetti |
| 5,337,196 A | 8/1994 | Kim |
| 5,555,024 A | 9/1996 | Limberg |
| 5,563,664 A | 10/1996 | Yang et al. |
| 5,584,051 A | 12/1996 | Goken |
| 5,604,929 A | 2/1997 | Loper et al. |
| 5,646,698 A | 7/1997 | Yang et al. |
| 5,796,842 A | 8/1998 | Hanna |
| 5,877,821 A | 3/1999 | Newlin et al. |
| 6,037,740 A | 3/2000 | Pollock et al. |
| 6,037,993 A | 3/2000 | Easley |
| 6,118,879 A | 9/2000 | Hanna |
| 6,147,713 A | 11/2000 | Robbins et al. |
| 6,192,086 B1 | 2/2001 | Darr |
| 6,259,482 B1 | 7/2001 | Easley et al. |
| 6,272,226 B1 | 8/2001 | Khan et al. |
| 6,281,813 B1 | 8/2001 | Vierthaler et al. |
| 6,417,890 B1 | 7/2002 | Welles et al. |
| 6,433,835 B1 | 8/2002 | Hartson et al. |
| 6,549,242 B1 | 4/2003 | Plonka |
| 6,588,867 B1 | 7/2003 | Darr |
| 7,425,995 B2 | 9/2008 | Johnson |
| 7,539,316 B2 | 5/2009 | Barnhill et al. |
| 7,639,307 B2 | 12/2009 | Barnhill et al. |
| 2004/0042621 A1 | 3/2004 | Hausman |
| 2005/0135630 A1 | 6/2005 | Zoso et al. |
| 2006/0026661 A1 | 2/2006 | McMullin et al. |
| 2006/0292980 A1 | 12/2006 | Marcos Alba |
| 2008/0106651 A1 | 5/2008 | Goyal et al. |
| 2009/0231491 A1 | 9/2009 | Barnhill et al. |

DIRECT DIGITAL ENCODING AND RADIO FREQUENCY MODULATION FOR BROADCAST TELEVISION APPLICATIONS

RELATED APPLICATION

This application is a continuation of U.S. application Ser. No. 12/627,317 filed Nov. 30, 2009, which is a continuation of Ser. No. 11/228,066 filed Sep. 16, 2006 which issued on May 18, 2010 as U.S. Pat. No. 7,719,616, which application claims priority from U.S. Provisional Patent Application Ser. No. 60/610,915, filed Sep. 17, 2004; the entire contents of which are incorporated herein by reference.

BACKGROUND

There are many different kinds of television video signals, the format of which varies from country to country. In the United States and Japan, for example, the NTSC format is used. NTSC stands for National Television Systems Committee, which is the name of the organization that developed the standard. In Europe, the PAL format is common. PAL stands for phase alternating line. SECAM is a standard used in France and stands for sequential colour avec memoire (sequential color with memory). It should be noted that there are about 15 different sub-formats contained within these three general formats. Each of these formats is not generally compatible with the others. Although they all utilize the same basic scanning system and represent color with a type of phase modulation, they differ in specific scanning frequencies, number of scan lines, and color modulation techniques.

For whatever type of television video standard employed, there are three basic levels of baseband video signal interfaces. In order of increasing quality, they are composite (or CVBS), which uses one wire pair; Y/C (or S-video), which uses two wire pairs; and component, which uses three wire pairs. Each wire pair consists of a signal and ground wire. These three interfaces differ in their level of information combination (or encoding). More encoding typically degrades the quality but allows the signal to be carried on fewer wires. Component signals have the least amount of encoding and composite signals the most.

Composite signals are the most commonly used analog video interface. Composite video is also referred to as CVBS, which stands for color, video, blanking, and sync, or composite video baseband signal. It combines the brightness information (luma), the color information (chroma), and the synchronized signals on just one cable.

The Y/C signal, often referred to as "S-video," is a less encoded video signal. Brightness (luma), which is the Y signal, and the color (chroma), the C signal, are carried on two separate sets of wires.

Component signal interfaces are the highest performance, because they have the least encoding. The signals exist in nearly native format. They always utilize three pairs of wires that are typically in either a luma (Y) and two-color difference-signals format or a red, green, blue (RGB) format. RGB formats are almost always used in computer applications, whereas color-difference formats are generally used in television applications. The Y signal contains the brightness (luma) and synchronizing information, and the color-difference signals contain the red (R) minus the Y signal and the blue (B) minus the Y signal. The theory behind this combination is that each the base R, G, and B components can be derived from these difference signals. Common variations of these signals are as follows:

(1) Y, B−Y, R−Y: Luma and color-difference signals.
(2) Y, Pr, Pb: Pr and Pb are scaled versions of B−Y and R−Y.
(3) Y, Cr, Cb: Digital signal equivalent to Y, Pr, Pb.
(4) Y, U, V: intermediate quadrature signals used in the formation of composite and Y/C signals.

Audio stereo signal standards for television broadcasts include MTS, standing for Multichannel Television Sound also know at the BTSC standard. This is one of the first developed stereo sound systems. BTSC is used in conjunction with NTSC/525, mainly in North America and parts of South America. BTSC, or MTS, comprises two, and sometimes three separate signals for transmitting stereo audio. The first signal is formed as the sum of the left and right audio signals, and can be detected by both monophonic television receivers (to preserve compatibility with such receivers) and stereo receivers. The second signal is formed as the difference between the left and right audio signals, and is detectable only by stereo receivers. In many cases, a third signal, the Secondary Audio Program (SAP), provides for a second language or a descriptive commentary for the blind.

The FM-FM standard is used in Germany, Austria, Holland, Switzerland and Australia. This standard uses a twin channel to transmit analog FM stereo transmissions Like BTSC, the secondary channel can be used to transmit a second language. NICAM, stands for Near Instantaneously Companded Audio Multiplex NICAM, officially called NICAM 728 and is used throughout Europe and Asia. NICAM is a digital two-channel audio transmission system with a sub-code selection of bilingual operation. Because it is digital, playback is that of near Compact Disc quality. EIAJ, standing for the Electronics Industry Association of Japan, was developed and is used in Japan. EIAJ systems use a subcarrier within the main FM audio carrier. The subcarrier is an FM subcarrier rather than the suppressed AM subcarrier used in the BTSC system or in FM radio broadcasting. Zweiton is a digital stereo standard that was developed out of A2 German Stereo and is used throughout Europe and Asia. Like the other systems, Zweiton has a main carrier signal and a secondary carrier signal usually used for the audio of a second language.

The television broadcast systems and standards described generally have employed analog and mixed analog-digital architectures to place the input audio and video signals onto intermediate (IF) frequencies. The use of IF frequencies and analog architectures has presented problems for use in digital television applications, including the requirement for intricate and costly filter topologies.

SUMMARY

In accordance with an aspect of the disclosure, a system for producing a television broadcast channel includes a digital video conditioner that is configured to receive a digitized broadcast-compatible video signal and to produce a conditioned video signal and a pilot signal. The system includes a digital encoder configured to receive at least two digitized audio signals and the pilot signal and to produce a combined audio signal. A digital modulator is part of the system and is configured to receive the conditioned video signal and the combined audio signal. The digital modulator is configured to (a) provide frequency modulation to the combined audio signal without the need to place the signals into intermediate frequencies, (b) provide amplitude modulation to the conditioned video signal, and (c) combine the combined audio signal and conditioned video signal to produce a complete broadcast transmission signal.

In one embodiment, the television further includes a digital-to-analog converter operatively coupled to the digital modulator and configured to receive the broadcast transmission signal and convert the broadcast transmission signal to an analog format. The system may include an analog-to-digital stage operatively coupled to the digital video conditioner and configured to convert an analog broadcast-compatible video signal to the digitized broadcast-compatible video signal. The digital video conditioner may be configured to receive a video signal complying with a standard selected from a group of standards including NTSC, the PAL, PAL I, PAL B, PAL G, PAL H, PAL M, PAL D, PAL N, SECAM, SECAM D, SECAM K, SECAM L, SECAM B, and SECAM G. The digital stereo encoder may be configured to receive audio signals complying with a group of standards including BTSC, dual-FM, EIA-J, and NICAM.

In accordance with another aspect of the disclosure, a system is provided for producing a television broadcast signal. The system may include an audio digitizing stage configured to receive left, right, and optional SAP analog audio signals and to convert the signals to a digital format. A stereo e.g., BTSC, encoder may be included that is configured to receive the digital format audio signals and encode them according the appropriate stereo sound standard. A video digitizing stage may be configured to receive a broadcast-compatible video signal and to convert the video signal to a digital format. A video conditioning stage may be configured to receive the digital video signal and to produce a pilot signal. An audio FM modulator may be configured to receive the digital combined audio signal and place it at a broadcast audio signal frequency, creating a modulated digital audio signal. A video AM modulator may be configured to receive the digital conditioned video signal and place it at a broadcast video signal frequency, creating a modulated digital video signal. The system may include a summer that is configured to sum the modulated digital audio signal and the modulated digital video signal to create a complete broadcast signal.

In one embodiment, the television audio signal encoder may also include a digital-to-analog converter (DAC) configured to receive the complete color broadcast signal and convert the complete color broadcast signal to an analog format. The system of claim may include at least one anti-aliasing filter. The system may include at least one line amplifier.

In accordance with another aspect of the disclosure, a computer program product residing on a computer readable medium may have a plurality of instructions stored thereon which, when executed by a processor, cause that processor to digitize and encode left and right audio signals according to a stereo standard. The instructions may cause the processor to produce a combined audio signal and stereo pilot signal from a broadcast compatible video signal. The instructions may cause the processor to place the combined audio signal at a desired final signal carrier frequency by frequency modulation. The instructions may cause the processor to place the video signal at a desired video signal carrier frequency by amplitude modulation. The instructions may cause the processor to combine the audio and video signals to create combined signal on a transmission signal.

In one embodiment, the computer program product may include instructions to convert the combined signal to an analog format. The computer program product may include instructions to provide the combined signal to at least one anti-aliasing filter. The computer program product may include instructions to provide the combined signal to at least one line amplifier. The computer program product may include instructions to digitize and encode a second audio program (SAP) audio signal according to stereo standard as part of the combined audio signal. The computer program product may include instructions to transmit the combined signal through a transmission medium.

In accordance with another aspect of the disclosure, a method may be provided for producing a broadcast signal. A stereo pilot signal may be extracted from a broadcast compatible video signal. Left and right audio signals may be digitized and encoded according to a stereo standard, e.g., BTSC. A combined audio signal may be formed. The combined audio signal may be placed at a desired final signal carrier frequency by frequency modulation. The video signal may be placed at a desired video signal carrier frequency by amplitude modulation. The audio and video signals may be digitally combined to create a combined digital signal on a transmission signal.

In one embodiment, the method may include converting the combined digital signal to an analog format. The method may include providing the combined digital signal to at least one anti-aliasing filter. The method may include providing the combined digital signal to at least one line amplifier. The method may include digitizing and encoding a SAP audio signal according to the BTSC standard as part of the combined audio signal.

Additional advantages and aspects of the present disclosure will become readily apparent to those skilled in the art from the following detailed description, wherein embodiments of the present invention are shown and described, simply by way of illustration of the best mode contemplated for practicing the present invention. As will be described, the present disclosure is capable of other and different embodiments, and its several details are susceptible of modification in various obvious respects, all without departing from the spirit of the present disclosure. Accordingly, the drawings and description are to be regarded as illustrative in nature, and not as limitative.

BRIEF DESCRIPTION OF THE DRAWINGS

Various aspects of the disclosure itself may be more fully understood from the following description when read together with the accompanying drawings. The drawings are not necessarily to scale, emphasis instead being placed on the principles of the disclosure. In the drawings.

DETAILED DESCRIPTION OF THE EMBODIMENTS

Figure 1:
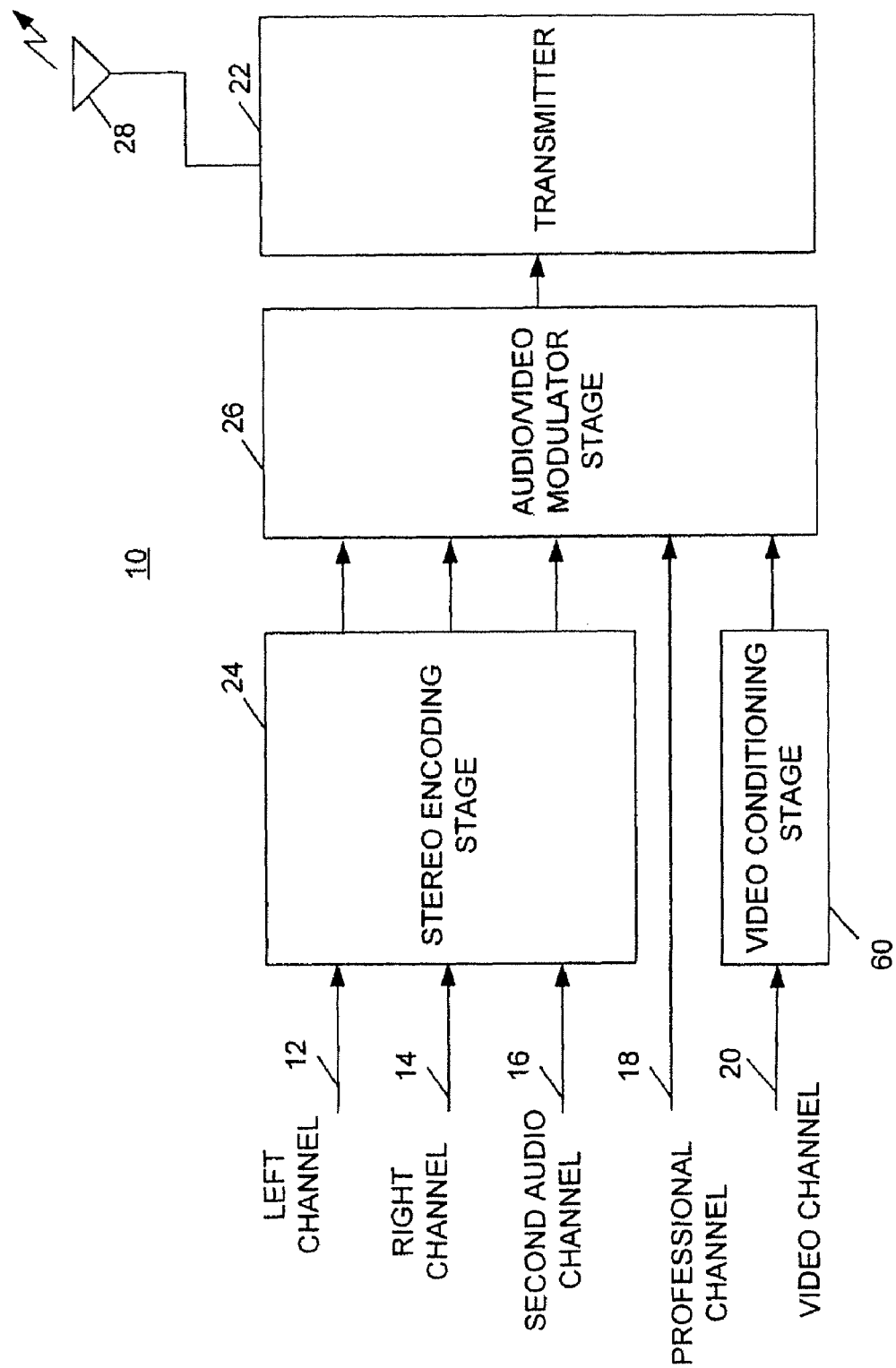
FIG. 1 is a block diagram representing a television signal transmission system configured to transmit a television broadcast signal directly through a digital combination without an IF step.

Referring to FIG. 1, a functional block diagram of a television signal transmitter 10 is presented that processes audio and video content of a television signal for transmission to one or more reception sites. The transmitter 10 produces a broadcast television signal directly at a radio frequency through digital combination without an intermediate frequency (IF) step. The audio content processed by the transmitter 10 may comply with various television standards such as the BTSC standard, the A2/Zweiton Standard, the EIA-J standard, the NICAM standard, the Dual FM standard, and others. The video content may comply with various standards such as the NTSC standard, the PAL standard, and the SECAM standard, and variations of these. Variations of the PAL standard include the PAL I, B, G, H, M, D, and N variations. Variations of the SECAM standard include the SECAM D, K, L, B, and G variations.

In the design shown in FIG. 1, a digital stereo audio encoding stage 24 is combined with a digital video conditioning stage 60 and a digital audio/video modulator stage 26. Left and right audio signals are provided on respective lines (e.g., conductive wires, cables, buses, etc.) 12 and 14. A secondary audio program (e.g., SAP) signal that includes additional signal information content (e.g., alternative languages, either as audio signals or subtitles for video viewing, etc.) may be provided by line 16. A fourth line 18 may provide a professional channel that would typically be used by broadcast television and cable television companies. To transmit video content, video channel signals are provided by a line 20 to a transmitter 22.

Signals from the audio channels are digitized and encoded to form stereo signals and then prepared for transmission. The stereo encoding stage 24 may produce sum and difference signals from the left and right channel signals and may use a pilot signal from the video signal(s). The stereo encoding stage may employ suitable stereo encoding such as described in U.S. Pat. No. 6,259,482, the contents of which are incorporated herein by reference. Video conditioning stage 60 may perform signal conditioning on digitized video signals of channel 20.

Audio/video modulator stage 26 may receive the processed audio signals, e.g., sum signal and difference signals, and video signals and prepare the signals for transmission. Additional signals present for some stereo standards, e.g., a professional channel for BTSC, may also be prepared for transmission by audio/video modulator stage 26. In this exemplary design, audio/video modulator stage 26 combines and provides the audio and video signals to transmitter 22.

In operation, the audio/video modulator stage 26 frequency modulates the stereo audio signals, placing them directly at a desired audio transmission signal frequency. The video signals are amplitude modulated by the audio/video modulator stage 26 and placed at a desired video transmission signal frequency. The audio and video signals at their respective transmission frequencies are then digitally combined, forming a complete television broadcast signal. Operations of the audio/video modulator stage 26 may be performed by utilizing a digital signal processor (DSP) or similar hardware techniques known to one skilled in the art of television audio and video signal processing. Software techniques known to one skilled in the art may likewise be used.

The signals of the broadcast channel may subsequently be transmitted, e.g., provided, for example, to an antenna (or an antenna system) 28, when the latter is needed for transmitting the signal. Various signal transmitting techniques known to one skilled in the art of television systems and telecommunications may be implemented by transmitter 22 and when needed antenna 28. For example, transmitter 22 may be incorporated into a cable television system (where an antenna is not needed), a broadcast television system, or other similar television audio and video content generation system.

Figure 2:
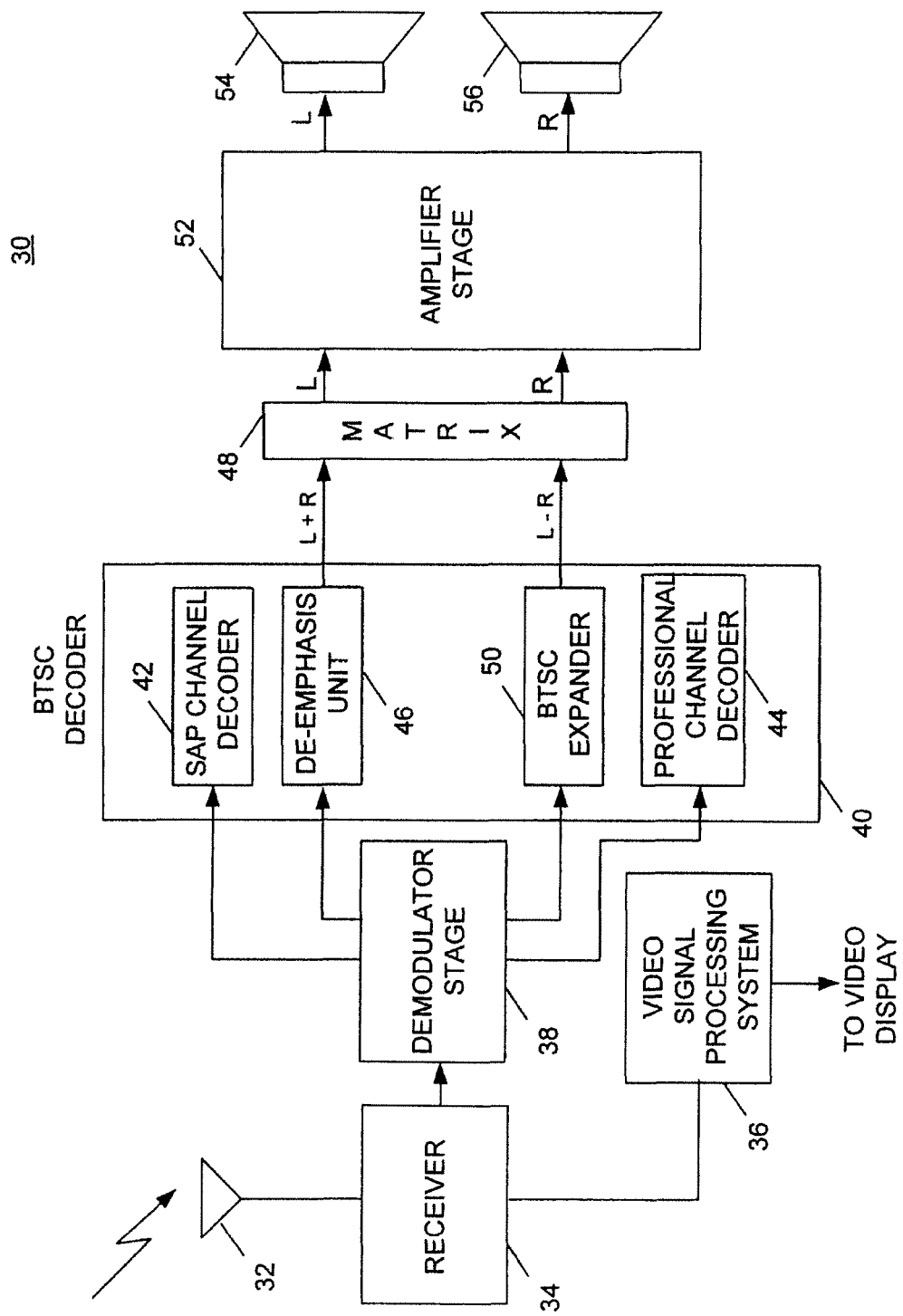
FIG. 2 is a block diagram representing a television receiver system that is configured to receive and decode the broadcast signal sent by a television signal transmission system, such as that shown in FIG. 1.

FIG. 2 is a block diagram representing a television receiver system 30 that is configured to receive and decode a television broadcast signal sent by a television signal transmission system, such as that shown in FIG. 1. The television receiver system 30 may include an antenna 32 (or a system of antennas) for receiving stereo compatible broadcast signals from television transmission systems such as system 10 (shown in FIG. 1). The system 30 is shown configured to receive BTSC audio signals but other stereo standards may of course be used.

For the receiver system 30, the received signals are preferably provided to a receiver 34, the latter being capable of detecting and isolating the television transmission signals. However, in some arrangements receiver 34 may receive the stereo compatible signals from another television signal transmission technique known to one skilled in the art of television signal broadcasting. For example, the television signals may be provided to receiver 34 over a cable television system or a satellite television network.

Upon receiving the television signals, receiver 34 conditions (e.g., amplifies, filters, frequency scales, etc.) the signals and separates the video signals and the audio signals from the transmission signals. The video content is preferably provided to a video processing system 36 that prepares the video content contained in the video signals for presentation on a screen (e.g., a cathode ray tube, etc.) associated with the television receiver system 30. Signals containing the separate audio content are preferably provided to a demodulator stage 38 that e.g., removes the modulation applied to the audio signals by television transmission system 10. The demodulated audio signals (e.g., an SAP channel signal, a professional channel signal, a sum signal, a difference signal) are preferably provided to a stereo, e.g., BTSC, decoder 40 that appropriately decodes each signal. When present, the SAP channel signal is preferably provided a SAP signal decoder 42 and the professional channel signal is preferably provided to a professional channel decoder 44. A demodulated sum signal (i.e., L+R signal) is preferably provided to a de-emphasis unit 46 that processes the sum signal in a substantially complementary fashion to the processing by stereo encoding stage 24 shown in FIG. 1. Upon de-emphasizing the spectral content of the sum signal, the signal is preferably provided to a matrix 48 for separating the left and right channel audio signals.

The difference signal (i.e., L–R) is also demodulated by demodulation stage 38 and is preferably provided to a stereo, e.g., BTSC, expander 50 that is included in stereo decoder 40. Stereo expander 50 complies with a suitable stereo standard, such as the BTSC standard, to condition the difference signal. Matrix 48 receives the difference signal from stereo expander 50 and with the sum signal, separates the right and left audio signals into independent signals (identified in the figure as "L" and "R"). By separating the signals, the individual right and left channel audio signals may be conditioned and provided to separate speakers. In this example, both the left and right audio signals are provided to an amplifier stage 52 that applies the same (or different) gains to each signal prior to providing the appropriate signals to a speaker 54 for broadcasting the left channel audio signal content and another speaker 56 for broadcasting the right channel audio content.

Digitized audio signals from a left, right, and SAP channel are preferably provided over respective lines 62, 64, and 66 to stereo encoder 58. Specifically, signals from the left and right audio channels are preferably provided to a matrix, such as described in U.S. Pat. No. 6,259,482, the contents of which are incorporated herein by reference. The matrix calculates a sum signal (e.g., L+R) and a difference signal (e.g., L–R) from the digital audio signals. Typically operations of the matrix are performed by utilizing a digital signal processor (DSP) or similar hardware techniques known to one skilled in the art of television audio and video signal processing. Alternatively, the operations of the matrix may be partially or completely implemented with software techniques known to one skilled in the art. Once produced, sum and difference signals (i.e., L+R and L−R) are encoded for transmission.

Figure 3:
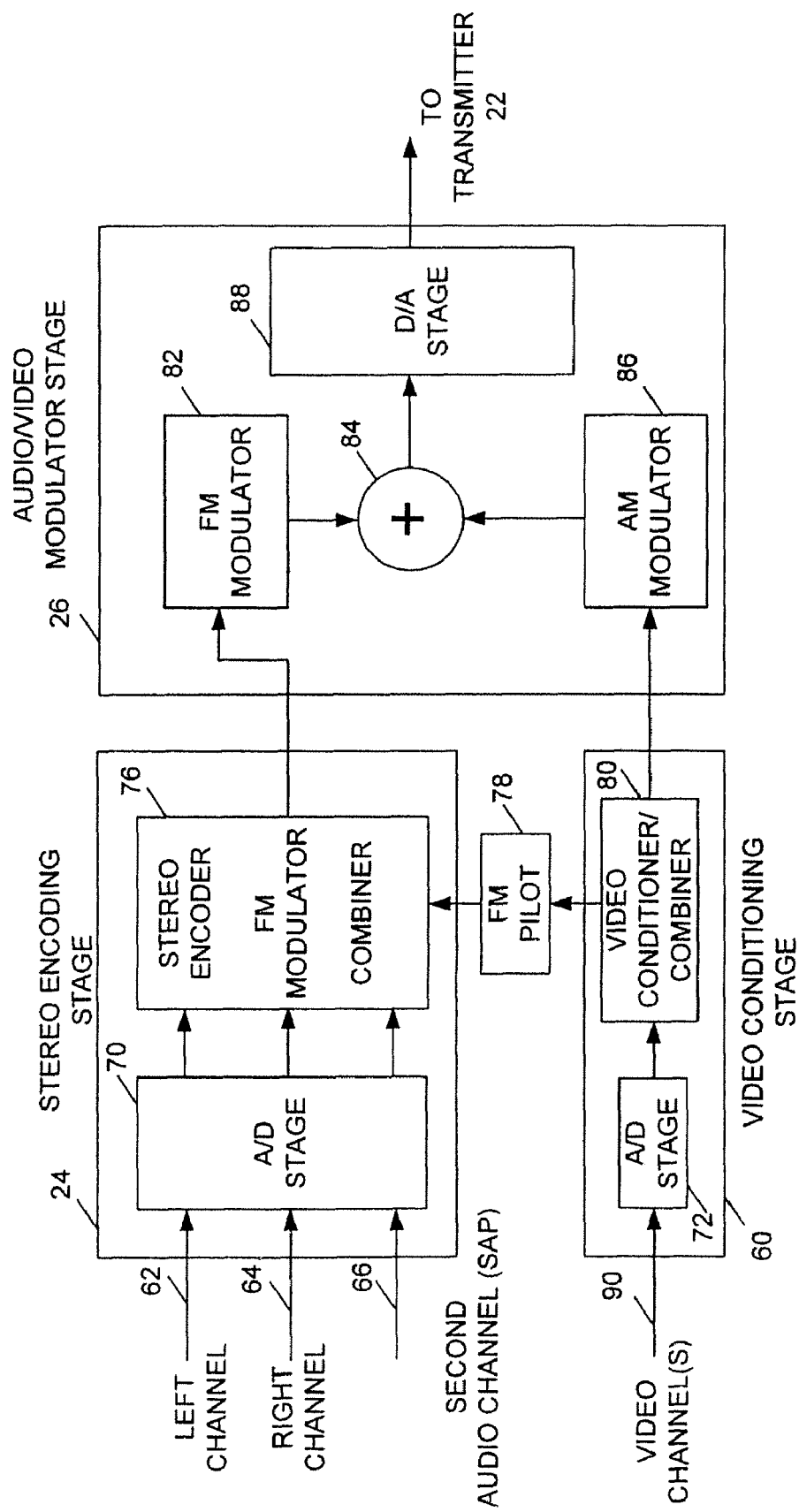
FIG. 3 is a block diagram representing a portion of the television signal transmission system shown in FIG. 1 that combines a digital stereo encoder with a digital video conditioner and a digital modulator functional block according to the teaching herein.

FIG. 3 is a block diagram representing a detailed portion of the television signal transmission system shown in FIG. 1. Left and right audio signals 62, 64 are digitized by an analog-to-digital stage (A/D) 70 within the stereo encoding stage 24. One or more suitable D/A converters may be used for this process. The digitized audio signal may then be encoded according to the relevant stereo standard specification, e.g., BTSC, for example as described in previously mentioned U.S. Pat. No. 6,259,482. When present, an incoming SAP signal 66 may also digitized, FM-modulated, and combined with the stereo data to produce a combined audio signal. A stereo pilot signal 78 required for the stereo encoding process may extracted from the incoming video signal on the video channel 90.

An FM modulator 82 within the audio/video modulator stage 26 places the combined audio signal directly at the carrier frequency at the desired final audio signal. For example, the audio frequency carrier for cable channel three according to the NTSC standard is located at the 65.75 MHz incrementally related carrier (IRC). Similarly, the audio frequency carrier for cable channel four would be 71.75 MHz (IRC). In this way, the use of an intermediate frequency (IF) can be avoided.

Input video signals on video channel 90 are digitized by an A/D stage within the video conditioning stage 60. Video conditioner/combiner 80 may be used to condition and combine the input video signals, producing a broadcast video signal. For example, video conditioner/combiner 80 may combine the signals to form a CVBS signal. The video conditioner/combiner 80 may act to limit the bandwidth of the combined signal and perform other signal conditioning, e.g., back-porch referenced DC-restoration.

Once the broadcast video signal has been generated, a digital AM modulator 86 can place the video at the proper video signal frequency. As an example, the video carrier frequency for NTSC cable channel three is 61.25 MHz (IRC), and the video carrier frequency for NTSC cable channel four is 67.25 MHz (IRC).

Once the audio and video signals have been placed on their respective carrier frequencies, they may be digitally combined by a summer 84 to create a complete transmission signal. The resulting combined digital television broadcast signal may then be passed through a digital-to-analog converter (DAC) 88 and then placed on the transmission medium, e.g., line to transmitter 22. Appropriate anti-aliasing filters and line amplifiers may be used to improve signal quality and boost power. The DAC is preferably a high-speed device.

Accordingly, aspects of the present disclosure may offer advantages over the prior art. Aspects may provide for the production of television broadcast signals directly at a signal frequency of interest without the need to use any intermediate frequency (IF) stages. Such architectures can provide for decreased costs and increased reliability for the television broadcasting.

In this example, stereo encoders, modulators, summers, and converters have been described as being implemented with hardware components (and may be manufactured, for example, as a single integrated circuit, and chip set, a hybrid circuit, or a circuit with discrete components), however, in some arrangements one or more operational portions of the stereo encoders, modulators, summers, and converters stages may be implemented in software or a combination of both. Software code may be provided in a suitable language, e.g., Verilog. This code may be stored on and retrieved from a storage device (e.g., RAM, ROM, hard-drive, CD-ROM, etc.) and executed on one or more general purpose processors and/or specialized processors such as a dedicated DSP.

While the previous examples have made reference to particular stereo standards, e.g., BTSC, and video standards, e.g., NTSC, other standards are within the scope of the present disclosure. For example, audio content may comply with various television standards such as the BTSC standard, the A2/Zweiton Standard, the EIA-J standard, the NICAM standard, the Dual FM standard, and others. The video content may comply with various standards such as the NTSC standard, the PAL standard, and the SECAM standard, and variations of these. Variations of the PAL standard include the PAL I, B, G, H, M, D, and N variations, and variations of the SECAM standard include the SECAM D, K, L, B, and G variations.

A number of implementations have been described. Nevertheless, it will be understood that various modifications may be made. Accordingly, other implementations are within the scope of the following claims.

What is claimed is:

1. A computer program product for producing a NTSC television signal and residing on a computer readable non-transitory storage medium having a plurality of instructions stored thereon which, when executed by a processor, cause that processor to:
   digitize and encode left and right audio channels in accordance with the BTSC stereo standard so as to produce a combined audio signal;
   extract a stereo pilot signal from a broadcast compatible video signal;
   place the combined audio signal directly at a desired final carrier frequency by frequency modulation without the use of an intermediate frequency signal;
   place the video signal at a desired video carrier frequency by amplitude modulation;
   combine the audio and video signals and create a combined digital signal suitable for transmission through a transmission medium; and
   convert the combined digital signal to an analog NTSC format signal.

2. The computer program product of claim 1, further comprising instructions to provide the NTSC signal to at least one line amplifier.

3. The computer program product of claim 1, further comprising instructions to digitize and encode a SAP audio channel according to the stereo standard as part of the combined audio channel.

4. The computer program product of claim 1, further comprising instructions to transmit the NTSC signal through a transmission medium.

5. A method of producing a NTSC television broadcast signal with a television broadcast signal system, the method comprising:
   with a digital video conditioner, extracting a stereo pilot signal from a broadcast compatible video signal;
   with a digital stereo encoder, digitizing and encoding left and right analog audio channels in accordance with the BTSC stereo audio standard, wherein a combined audio channel results;
   with a digital modulator, placing the combined audio channel directly at a desired final channel carrier frequency by frequency modulation without the need for use of a signal of intermediate frequency;

with the digital modulator, placing the video signal at a desired video channel carrier frequency by amplitude modulation;

with the digital modulator, combining the audio and video signals and creating a combined digital signal on a transmission channel; and converting the combined digital signal to a NTSC analog format signal.

6. The method of claim 5, further comprising providing the NTSC analog format signal to at least one line amplifier.

7. The method of claim 5, further comprising digitizing and encoding a SAP audio channel according to the stereo standard as part of the combined audio channel.

* * * * *